(12) United States Patent
Bintz et al.

(10) Patent No.: US 6,937,811 B2
(45) Date of Patent: Aug. 30, 2005

(54) POLYMER WAVEGUIDE DEVICES INCORPORATING ELECTRO-OPTICALLY ACTIVE POLYMER CLADS

(75) Inventors: Louis J. Bintz, Bothell, WA (US); Raluca Dinu, Redmond, WA (US); Danliang Jin, Bothell, WA (US)

(73) Assignee: Lumera Corporation, Bothell, WA (US)

(*) Notice: Subject to any disclaimer, the term of this patent is extended or adjusted under 35 U.S.C. 154(b) by 246 days.

(21) Appl. No.: 10/299,155

(22) Filed: Nov. 19, 2002

(65) Prior Publication Data

US 2004/0096180 A1 May 20, 2004

(51) Int. Cl.[7] ................................................ G02B 6/10
(52) U.S. Cl. ........................ 385/143; 385/145; 385/131
(58) Field of Search .................. 385/8, 9, 14, 129–132, 385/141–145

(56) References Cited

U.S. PATENT DOCUMENTS

| | | | |
|---|---|---|---|
| 4,749,245 A | 6/1988 | Kawatsuki et al. | |
| 5,120,339 A | 6/1992 | Markovich et al. | |
| 5,133,037 A | 7/1992 | Yoon et al. | |
| 5,170,161 A | 12/1992 | Sakurai | |
| 5,170,461 A | 12/1992 | Yoon et al. | |
| 5,198,513 A | 3/1993 | Clement et al. | |
| 5,219,788 A | 6/1993 | Abernathey et al. | |
| 5,223,356 A | 6/1993 | Kumar et al. | |
| 5,370,969 A | 12/1994 | Vidusek | |
| 5,433,895 A | 7/1995 | Jeng et al. | |
| 5,480,687 A | 1/1996 | Heming et al. | |
| 5,497,445 A | 3/1996 | Imoto | |
| 5,635,576 A | 6/1997 | Foll et al. | |
| 5,714,304 A | 2/1998 | Gibbons et al. | |
| 5,776,374 A | 7/1998 | Newsham et al. | |
| 5,783,319 A | 7/1998 | Reisfeld et al. | |

(Continued)

FOREIGN PATENT DOCUMENTS

| | | |
|---|---|---|
| EP | 0961139 | 12/1999 |
| JP | 04238305 | 8/1992 |
| JP | 09258151 | 10/1997 |
| JP | 10048443 | 2/1998 |
| JP | 10232323 | 9/1998 |
| JP | 2001235640 | 8/2001 |
| JP | 2001255426 | 9/2001 |

OTHER PUBLICATIONS

Bailey et al., "Step and flash imprint lithography: Template surface treatment and defect analysis," *J. Vac. Sci. Technol. B*, 2000, 18(6):3572–3577.

Chen et al., "Thermosetting Polyurethanes with Stable and Large Second–Order Optical Nonlinearity," *Macromolecules*, 1992, 25:4032–4035.

Grote et al., "Effect of conductivity and dielectric constant on the modulation voltage for optoelectronics devices based on nonlinear optical polymers," *Opt. Eng.*, 2001, 40(11):2464–2473.

(Continued)

*Primary Examiner*—Akm Enayet Ullah
*Assistant Examiner*—Kevin S. Wood
(74) *Attorney, Agent, or Firm*—Fish & Richards P.C., P.A.

(57) ABSTRACT

An electro-optic waveguide device that includes (a) an electro-optic polymer core having a refractive index and (b) an electro-optic first polymer clad in proximity to the electro-optic polymer core. The electro-optic first polymer clad having a refractive index that is lower than the refractive index of the electro-optic polymer core

19 Claims, 4 Drawing Sheets

U.S. PATENT DOCUMENTS

| | | | |
|---|---|---|---|
| 5,811,507 A | | 9/1998 | Chan et al. |
| 5,861,976 A | | 1/1999 | Hoekstra |
| 5,887,116 A | | 3/1999 | Grote |
| 5,970,186 A | * | 10/1999 | Kenney et al. ............... 385/16 |
| 6,002,828 A | | 12/1999 | Hult et al. |
| 6,011,641 A | * | 1/2000 | Shin et al. ................. 359/251 |
| 6,019,906 A | | 2/2000 | Jang et al. |
| 6,031,945 A | | 2/2000 | You et al. |
| 6,126,867 A | | 10/2000 | Kanitz et al. |
| 6,229,949 B1 | | 5/2001 | Ido et al. |
| 6,294,573 B1 | | 9/2001 | Curtin et al. |
| 6,303,730 B1 | | 10/2001 | Fries et al. |
| 6,306,563 B1 | | 10/2001 | Xu et al. |
| 6,323,361 B1 | | 11/2001 | Wu et al. |
| 6,335,149 B1 | | 1/2002 | Xu et al. |
| 6,419,989 B1 | | 7/2002 | Betz et al. |
| 6,434,282 B1 | * | 8/2002 | Binkley et al. ................ 385/8 |
| 6,449,417 B1 | * | 9/2002 | Binkley et al. ............ 385/129 |
| 6,466,707 B1 | | 10/2002 | Dawes et al. |
| 6,473,551 B2 | | 10/2002 | Norwood et al. |
| 6,687,425 B2 | * | 2/2004 | Ridgway et al. .............. 385/14 |
| 6,782,149 B2 | * | 8/2004 | Ridgway et al. .............. 385/11 |
| 6,785,435 B2 | * | 8/2004 | Ridgway et al. .............. 385/14 |
| 2001/0041025 A1 | | 11/2001 | Farahi |

OTHER PUBLICATIONS

Ma et al., "A Novel Class of High–Performance Perfluorocyclobutane–Containing Polymers for Second–Order Nonlinear Optics," *Chem. Mater.*, 2000, 12:1187–1189.

Ma et al., "Highly Efficient and Thermally Stable Nonlinear Optical Dendrimer for Electrooptics," *J. Am. Chem. Soc.*, 2001, 123:986–987.

Mao et al., "Progress toward Device–Quality Second–Order Nonlinear Optical Materials. 1. Influence of Compositions and Processing Conditions on Nonlinearity, Temporal Stability, and Optical Loss," *Chem. Mater.*, 1998, 10:146–155.

Oh et al., "Electro–optic polymer modulators for 1.55 $\mu$m wavelength using phenyltetraene bridged chromophore in polycarbonate," *Appl. Phys. Lett.*, 2000, 76(24):3525–3527.

Resnick et al., "Release Layers for Contact and Imprint Lithography," *Semicon. Int.*, Jun. 2002, online version, 7 pgs.

Chon and Comita, "Laser ablation of nonlinear–optical polymers to define low–loss optical channel waveguides," *Optics Letters*, 1994, 19(22):1840–1842.

Jin et al., "Material development and processing for electro–optic device systems," *Organic Photonic Materials and Devices V—Proceedings of SPIE*, 2003, 4991:610–620.

Liu et al., "Embossed Bragg gratings based on organically modified silane waveguides in InP," *Applied Optics*, 2000, 39(27):4942–4945.

Oh et al., "Electro–optic polymer modulators for 1.55 $\mu$m wavelength using phenyltetrane bridged chromophore in polycarbonate," *Applied Physics Letters*, 2000, 76(24):3525–3527.

Que et al., "Sol–gel fabrication and properties of optical channel waveguides and gratings made from composites of titania and organically modified silane," *Opt. Eng.*, 2002, 41(7):1733–1737.

* cited by examiner a b c d

POLYMER WAVEGUIDE DEVICES INCORPORATING ELECTRO-OPTICALLY ACTIVE POLYMER CLADS

BACKGROUND OF THE INVENTION

All patents, patent applications, and publications cited within this application are incorporated herein by reference to the same extent as if each individual patent, patent application or publication was specifically and individually incorporated by reference.

The invention relates generally to the field of electro-optic polymer waveguide devices. The art of electro-optic polymer waveguide devices and the use of organic second order nonlinear optical polymers in such devices is well documented. A typical electro-optic polymer waveguide, which is illustrated as a cross-sectional view in FIG. 1, is comprised of: 1) an electro-optic polymer core (5); 2) a first polymer clad (10) overlying the electro-optic polymer core (5); 3) a second polymer clad (15) underlying the electro-optic polymer core (5); 4) a top electrode (20) overlying the first polymer clad (10); 5) a bottom electrode (25) underlying the second polymer clad (15); and 6) a substrate (30).

In a typical electro-optic polymer waveguide, the total thickness of the core, first clad, and second clad is around 6–10 $\mu$m. Typically, the refractive indices of the polymer clads are chosen to confine a great majority of the optical field in the electro-optic polymer core and keep the optical field from contacting the metal electrodes. The resulting mode in the waveguide is elliptical to such an extent that unacceptably high insertion results when the waveguide is butt-coupled to an optical fiber. The insertion loss can be reduced by using tapers to adjust the size of the fiber mode to the size of the waveguide mode. However, such tapers can be difficult to manufacture.

Making the waveguide mode less elliptical can also reduce insertion loss. A less elliptical waveguide mode can be achieved by decreasing the difference in refractive indices between the clads and electro-optic core. However, such an approach may lead to the optical field contacting one or both of the electrodes, which may cause increased optical loss or complete loss of mode confinement. Such a problem may be overcome by adding lower refractive index clads to act as barriers between the first and second clads and metal electrodes.

U.S. Pat. No. 5,861,976 describes a thermo-optic waveguide having four cladding layers in order to reduce insertion loss while confining the mode away from the silicon substrate and metal heater strip. The first and second "core matching" cladding layers have refractive indices that are 0.0055 lower than the core, while the third and fourth cladding layers have refractive indices that are 0.0215 lower than the first and second cladding layers. The overall device thickness is around 20 $\mu$m. The insertion loss of the device is reportedly 2 dB/cm. Although the thermo-optic device showed good (i.e., low) insertion loss, such a device structure applied to electro-optic waveguides would lead to poor power performance since the electrodes are farther away from the electro-optic core than in a typical electro-optic waveguide device; the problem would be compounded since a lesser percentage of light propagates in the core relative to typical electro-optic device structures.

SUMMARY OF THE INVENTION

An electro-optic waveguide device is described that includes an electro-optic polymer core having a refractive index and an electro-optic first polymer clad in proximity to the electro-optic polymer core. By "in proximity to" it is meant that the core and clad are in contact with each other or separated by a thin (e.g., less than about 0.1 $\mu$m or so) adhesion promoter, surface promoter, or primer layer, as is known in the art. The refractive index of the clad is lower than the refractive index of the core. The waveguide may further include, alone or in combination with each other: (a) a second polymer clad in proximity to the electro-optic core, the second polymer clad having a refractive index that is lower than the refractive index of the core; (b) a first polymer buffer clad in proximity to the electro-optic first polymer clad, the first polymer buffer clad having a refractive index that is lower than the refractive index of the electro-optic first polymer clad; and (c) a second polymer buffer clad in proximity to the second polymer clad, the second polymer buffer clad having a refractive index that is lower than the refractive index of the second polymer clad. As used herein, a "buffer clad" is the outermost layer from the core of the waveguide and has a refractive index sufficiently low to keep the optical mode from contacting electrodes that would cause optical loss (e.g., gold electrodes).

The electro-optic first polymer clad increases the power efficiency of the device since some of the propagating mode resides in the first polymer clad. Additionally, the structure also decreases optical insertion loss since the propagating mode is both less elliptical and does not contact the metal electrodes due to the buffer clads.

Other features and advantages will be apparent from the following description of the preferred embodiments, and from the claims.

DETAILED DESCRIPTION

In one embodiment, an electro-optic waveguide device comprises an electro-optic polymer core and an electro-optic first polymer clad in proximity to the electro-optic polymer core, the electro-optic first polymer clad having a refractive index that is lower than the refractive index of the electro-optic polymer core. The electro-optic first polymer clad increases the power efficiency of the device since some of the propagating mode resides in the first polymer clad. Both the electro-optic core polymer layer and the electro-optic clad polymer layer can be formed by methods known to those skilled in the art such as spin-coating, dip-coating, brushing, and printing.

Figure 3:
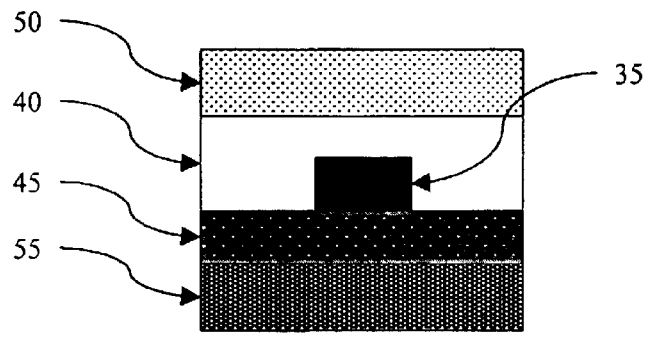
FIG. 3 is a cross-sectional view of various electro-optic core configurations in the polymer stack.
Figure 3:
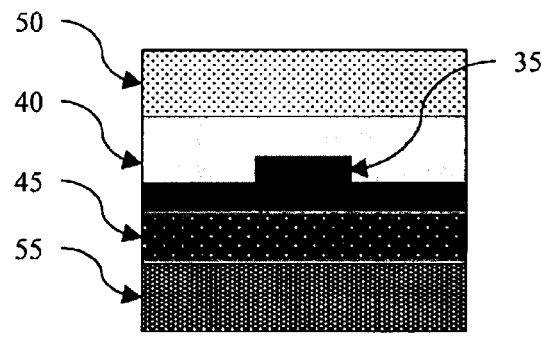
Figure 3:
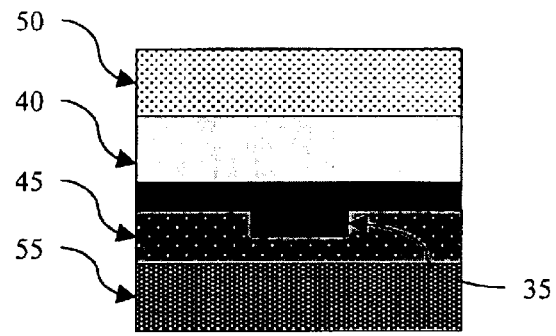
Figure 3:
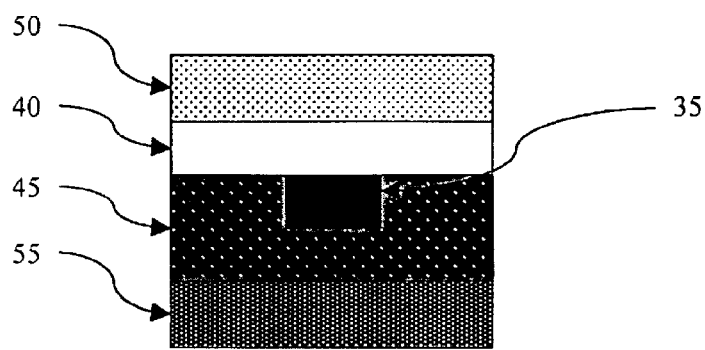

In general, an electro-optic polymer comprises a second order nonlinear optical chromophore and a polymer matrix. In some embodiments, the chromophore can be covalently attached to the polymer backbone. The electro-optic core can be poled by any one of the techniques known to those skilled in the art including corona poling, electrode poling, or push-pull poling. The electro-optic core can be shaped by reactive ion etching, laser ablation, bleaching, positive tone photolithography, negative tone photolithography, or embossing. Referring to FIG. 3, the electro-optic core can be shaped as a "rib" (FIG. 3a), a "quasi-rib" (FIG. 3b), a "quasi-trench" (FIG. 3c), or a "buried-trench" (FIG. 3d). Preferably, the electro-optic device is a Mach Zehnder modulator, a directional coupler, or a micro-ring resonator.

Figure 1:
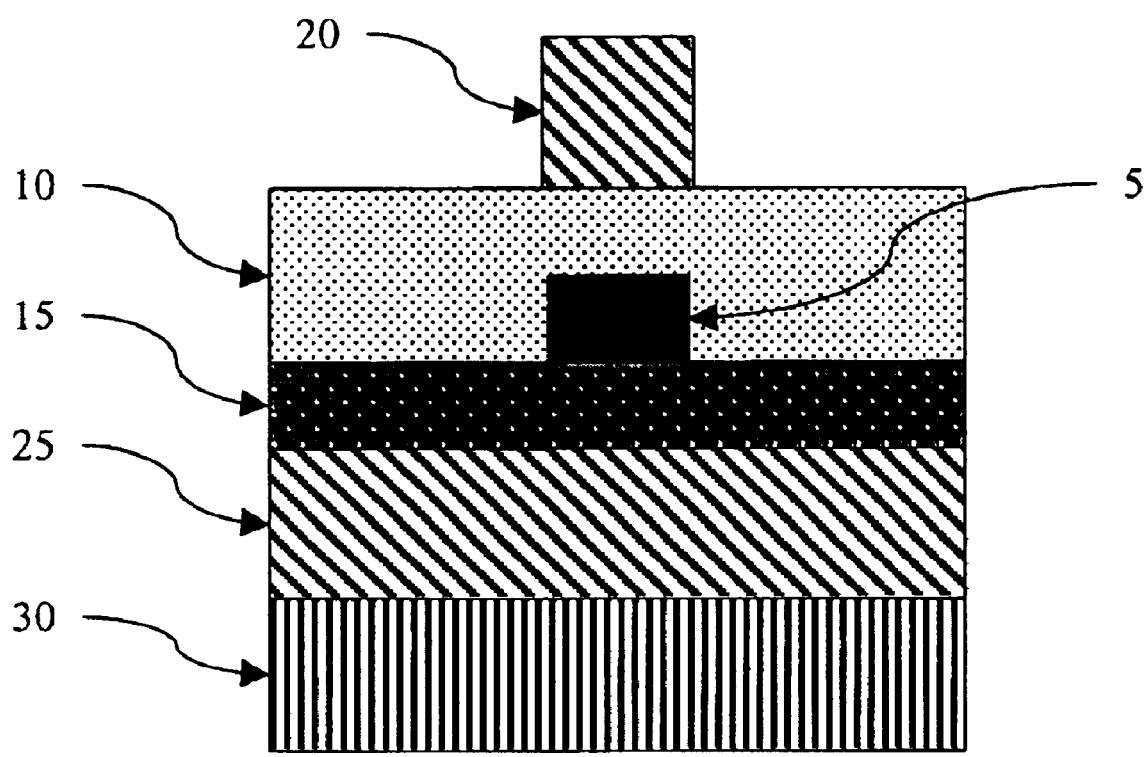
FIG. 1 illustrates a typical prior art electro-optic polymer waveguide device.
Figure 2:
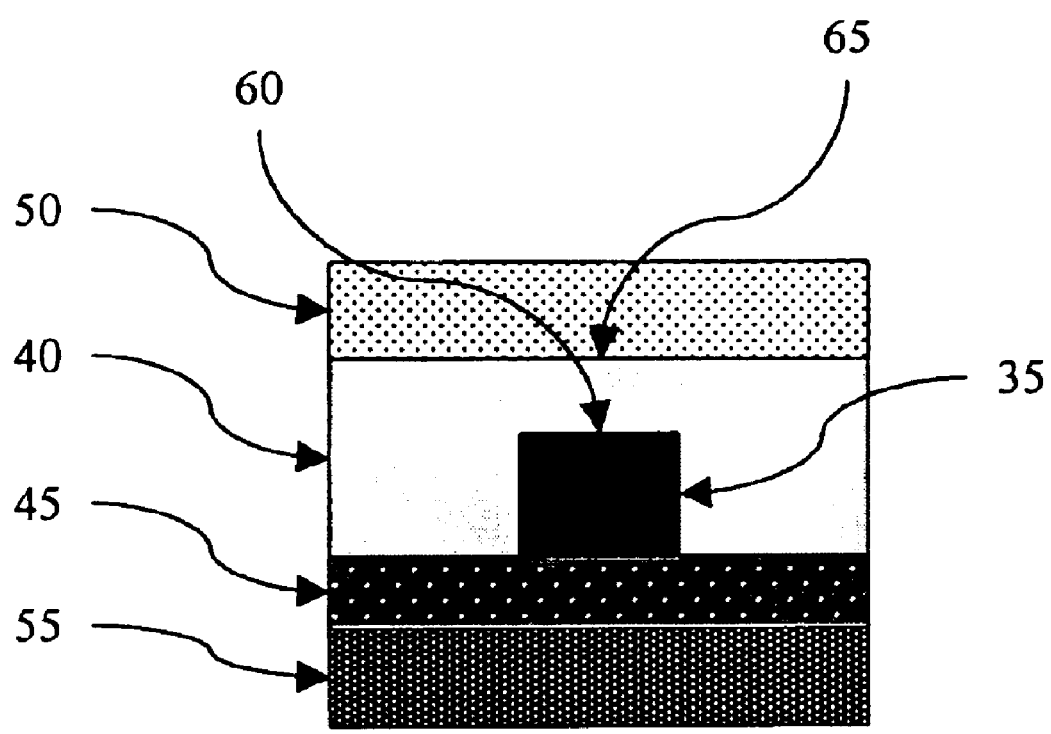
FIG. 2 is a cross-sectional view of one embodiment of an electro-optic polymer waveguide device.

In a preferred embodiment, the electro-optic waveguide device comprises, referring to FIG. 2: 1) an electro-optic polymer core (35); 2) an electro-optic first polymer clad (40) in proximity to the electro-optic polymer core, the electro-optic first polymer clad having a refractive index that is lower than the refractive index of the electro-optic polymer core; 3) a second polymer clad (45) in proximity to the electro-optic polymer core, the second polymer clad having a refractive index that is lower than the refractive index of the electro-optic polymer core; 4) a first polymer buffer clad (50) in proximity to the electro-optic first polymer clad, the first polymer buffer clad having a refractive index that is lower than the refractive index of the electro-optic first polymer clad; and 5) a second polymer buffer clad (55) in proximity to the second polymer clad, the second polymer buffer clad having a refractive index that is lower than the refractive index of the second polymer clad. The electro-optic polymer core, electro-optic first polymer clad, second polymer clad, first polymer buffer clad, and second polymer buffer clad can each be formed independently by methods, known to those skilled in the art such as spin-coating, dip-coating, brushing, and printing. In another embodiment, the second polymer clad is an electro-optic polymer or, preferably, a crosslinked electro-optic polymer.

Figure 4:
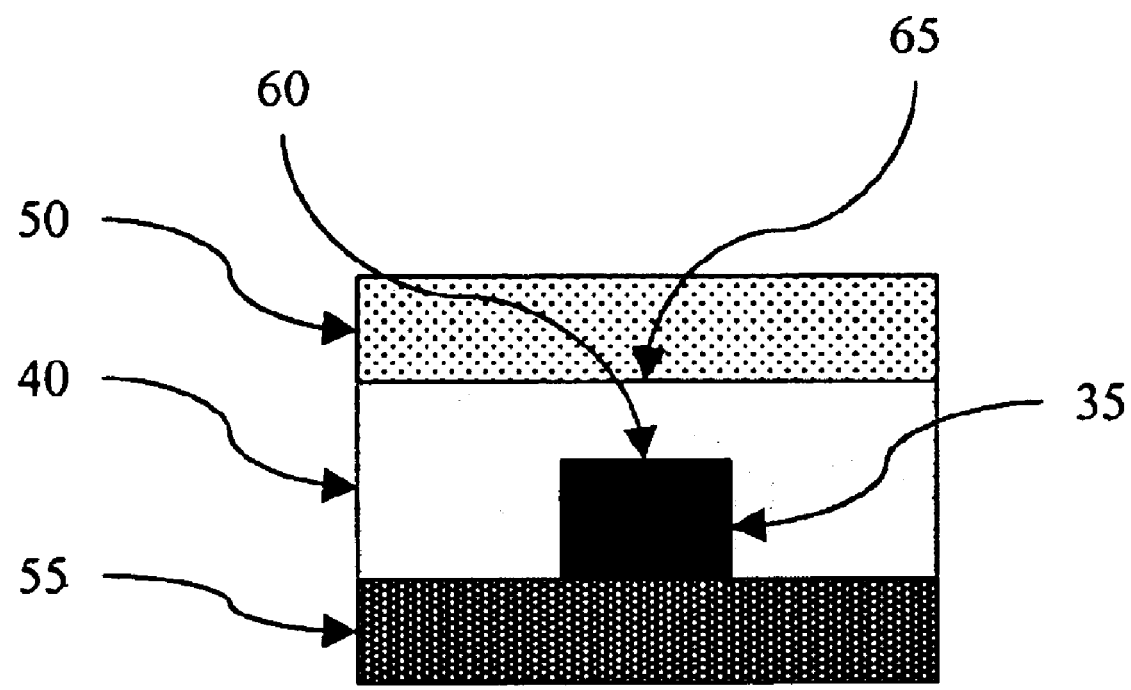
FIG. 4 is a cross-sectional view of another embodiment of an electro-optic polymer waveguide device.

In another embodiment, the electro-optic waveguide device comprises, referring to FIG. 4: 1) an electro-optic polymer core (35); 2) an electro-optic first polymer clad (40) in proximity to the electro-optic polymer core, the electro-optic first polymer clad having a refractive index that is lower than the refractive index of the electro-optic polymer core; 3) a first polymer buffer clad (50) in proximity to the electro-optic first polymer clad, the first polymer buffer clad having a refractive index that is lower than the refractive index of the electro-optic first polymer clad; and 4) a second polymer buffer clad (55) in proximity to the electro-optic polymer core, the second polymer buffer clad having a refractive index that is lower than the refractive index of the electro-optic polymer core. The electro-optic polymer core, electro-optic polymer first clad, first polymer buffer clad, and second polymer buffer clad can each be formed independently by methods known to those skilled in the art such as spin-coating, dip-coating, brushing, and printing.

The refractive index and thickness of each polymer layer is chosen so that the resulting waveguide has single mode behavior. The refractive index of each layer, thickness of each clad, and the dimensions of the core that would give single mode behavior in the resulting waveguide can be calculated using techniques and computer programs known to those skilled in the art (such as the BeamProp Version 5.0 software from Rsoft). Preferable ranges for the thickness and the refractive index of the various layers are summarized in Table 1. Preferably, referring to FIG. 2, the electro-optic core (35) is shaped as a rib and has a thickness of about 2.4–about 3.8 $\mu$m and a refractive index of about 1.54–about 1.62, the electro-optic first polymer clad (40) has a thickness between the electro-optic core surface (60) and the electro-optic first polymer clad surface (65) of about 1.0–about 3.0 $\mu$m and a refractive index of about 1.53–about 1.61, the second polymer clad (45) has a thickness of 0–about 3.0 $\mu$m and a refractive index of about 1.53–about 1.61, the first polymer buffer clad (50) has a thickness of about 2.2–about 3.2 $\mu$m and a refractive index of about 1.445–about 1.505, and the second polymer buffer clad has a thickness of about 2.2–about 3.2 $\mu$m and a refractive index of about 1.445–about 1.505. The preferable ranges for refractive index, layer thickness, and core dimensions for the various layers are given below in Table 1.

TABLE 1

| Layer | Thickness ($\mu$m) | Width ($\mu$m) | Refractive Index |
|---|---|---|---|
| First Polymer Buffer Clad | 2.2–3.2 | — | 1.445–1.505 |
| First Polymer Clad | 1.0–3.0 | — | 1.53–1.61 |
| Core | 2.4–3.8 | 2.8–4.2 | 1.54–1.62 |
| Second Polymer Clad | 0–3.0 | — | 1.53–1.61 |
| Second Polymer Buffer Clad | 2.2–3.2 | — | 1.445–1.505 |

In another embodiment, the electro-optic core is crosslinked, the electro-optic first polymer clad is crosslinked, the second polymer clad is an organically modified sol-gel (ORMOSIL), the first polymer buffer clad is a radiation-cured acrylate, and the second polymer buffer clad is an organically modified sol-gel. Crosslinkable electro-optic polymers, sol-gels, ORMOSILs, and radiation cured acrylates are known to those skilled in the art, for example see U.S. Pat. Nos. 6,419,989; 6,335,149; 6,323,361; 6,306,563; 6,303,730; 6,294,573; 6,126,867; 6,002,828; 5,811,507; 5,783,319; 5,776,374; 5,635,576; 5,714,304; 5,480,687; 5,433,895; 5,223,356; and 5,120,339; Chem. Mater. 2000, 12, 1187; J. Am Chem. Soc. 2001, 123, 986; Macromolecules 1992, 25, 4032; and Chem. Mater. 1998, 10, 146. Preferably, the second polymer clad comprises a organically modified titania-siloxane sol gel.

The optical waveguide devices described herein comprising an electro-optic polymer core and an electro-optic first polymer clad having a refractive index that is lower than the refractive index of the electro-optic polymer core can be used in optical communications systems. The optical communications systems employing such modulators will be improved due to the increased power efficiency of the waveguide devices having an electro-optic polymer clad and an electro-optic polymer core. Thus, other embodiments of the invention include communications systems such as beam steering systems, phased array radars, optical routers, optical transponders, and optical satellites.

EXAMPLES

The following example(s) is illustrative and does not limit the Claims.

The preparation of materials used in the following example is given below:

The electro-optic chromophore used in the electro-optic core and electro-optic clad was prepared by esterifying a chromophore containing free alcohol groups with the required equivalents of 4-(trifluorovinyloxy)-benzoyl chloride (the benzoyl chloride is described in U.S. Pat. No. 5,198,513) and a hindered amine base or pyridine.

The polymer used as a matrix for the electro-optic chromophore was prepared by reacting 1-lithio-4-trifluovinyloxybenzene with pentafluorostyrene at −78° C. for 1 h followed by warming to room temperature. The resulting 2,3,5,6-fluoro-4'-trifluorovinyloxy-4-vinyl biphenyl was purified by column chromatography and polymerized with AIBN initiation in THF under $N_2$ atmosphere. The polymer was purified by precipitation from THF/hexanes.

The titanium doped organically modified sol gel used as the second polymer clad was prepared by: 1) dripping 127.2 g of titanium butoxide (from Aldrich, double distilled) into a solution of 592 g of anhydrous ethanol and 24.0 g of concentrated DCl (~37 wt %); 2) dripping 94.3 g of D$_2$O; 3) dripping 99.2 g of glycidoxypropyltrimethoxysilane; 4) heating at ~80° C. for 12 hours; 5) dripping 372.0 g of phenyltriethoxysilane (from Aldrich, distilled) while at ~80° C. for 4 hours; and 6) adding distilled 473 g of cyclohexanone into the solution and stir to homogeneity. The low boiling volatiles from the reaction were removed by rotary evaporation. Finally, 1.60 g of poly[dimethylsiloxane-co-methyl(3-hydroxypropyl)siloxane]-graft-poly(ethylene/-propylene glycol) (from Aldrich, used as received) was added into the above solution and stirred to obtain a homogeneous solution.

The polymer used as the first polymer buffer clad was prepared by: 1) stirring 20.0 g of pentaerythritol tetraacrylate (Aldrich, used as received) and 20.0 g tri(ethylene glycol) dimethacrylate (Aldrich, used as received); 2) adding 1.2 g of 2-methyl-4'-(methylthio)-2-morpholinopropiophenone and stirring until dissolution; and 3) refrigerating the resulting solution.

The polymer used as the second polymer buffer clad was prepared by: 1) adding 156.0 gram tetraethyl orthosilicate (from Aldrich, double distilled), 531.0 g glycidoxypropyl-trimethoxysilane (from Aldrich, double distilled), 321.0 g cyclohexanone (from Aldrich, distilled) to a flask; 2) dripping a solution of 187.5 g D$_2$O and 7.50 g 2M DCl; and 3) heating at 80–100° C. for 5 hours.

An adhesion promoter for the second polymer buffer clad and gold was prepared by: 1) heating 100.0 g of isopropyl alcohol (from Aldrich), 2.0 g of H$_2$O, 5.0 g of mercapto-propyltriethoxysilane (from Sigma, distilled) and 5.0 g of mercaptopropylmethyl-dimethoxysilane, and two drops of 37% HCl at reflux for 2 hours; 2) allowing the solution cool down to room temperature; 3) adding 504 g of isopropyl alcohol to the above solution and stirring.

The device in this example was fabricated using a gold-covered SiO$_2$ 6-inch wafer as a substrate.

The adhesion promoter for the second polymer buffer clad and gold was applied to the gold surface by spin depositing a 1% solution at 500 rpm for 2 seconds and 4500 rpm for 30 seconds.

The second polymer buffer clad was spin deposited as a 36.1% (by weight) solution in cyclopentanone at 300 rpm for 12 seconds and 1050 rpm for 20 seconds. The wafer layer was cured by heating under 50 Torr of vacuum at 100° C. for 60 min (heating rate of 0.5° C./min), 150° C. for 60 min (heating rate of 3° C./min), and 200° C. for 30 min (heating rate of 5° C./min), and cooling the wafer to ambient temperature at a cooling rate of 0.5° C./min. The thickness of the layer is 2.9 μm and the refractive index is 1.475.

The second polymer clad was spin deposited on the second polymer buffer clad as a 38% (by weight) solution in cyclohexanone at 500 rpm for 5 seconds and 2900 rpm for 30 seconds. The wafer layer was cured by heating under 50 Torr of vacuum at 100° C. for 60 min (heating rate of 0.5° C./min), 150° C. for 60 min (heating rate of 3° C./min), and 190° C. for 90 min (heating rate of 5° C./min), and cooling the wafer to ambient temperature at a cooling rate of 0.5° C./min. The thickness of the layer was 1.9 μm and the refractive index was 1.545.

An adhesion promoter layer was applied to the second polymer clad by spin depositing a 1% (by weight) solution of (N-(2-aminoethyl)-3-aminopropylmethyl-dimethoxysilane) in isopropyl alcohol at 500 rpm for 5 sec and 3000 rpm for 30 sec. The wafer was then heated on a hot plate at 100° C. for 5 min.

The polymer used for the electro-optic core was spin deposited on the second polymer clad as a 30% (by total solids weight) solution of the electro-optic chromophore in the polymer matrix (the chromophore concentration with respect to the crosslinkable polymer was 25% by weight) in cyclopentanone at 300 rpm for 2 sec then 500 rpm for 5 sec, then 1000 rpm for 20 sec. The film was precured by heating at 80° C. on a hot plate for 10 min, heating at 70° C. at 1 mTorr for 480 min. The film was Corona poled and crosslinked by applying a voltage of 4.5 kV to the wafer while heating to 180° C. over 10 min, holding at 4.5 kV at 180° C. for 10 min, increasing the Corona voltage to 7.5 kV and holding at 180° C. for 10 min, and cooling to ambient temperature over 25 min. Heating at 180° C. was necessary to affect the desired amount of crosslinking. The thickness of the layer was 3.0 μm and the refractive index was 1.565.

The electro-optic polymer core was formed as a rib using a hardmask and dry etching as described in commonly assigned, co-pending U.S. application Ser. No. 10/264,461. The electro-optic polymer core was formed as a Mach-Zehnder Modulator.

The polymer used for the electro-optic first polymer clad was spin deposited on the electro-optic core and the second polymer clad as a 23% (by total solids weight) solution of the electro-optic chromophore in the polymer matrix (the chromophore concentration with respect to the crosslinkable polymer was 21% by weight) in cyclopentanone at 300 rpm for 2 sec then 500 rpm for 5 sec, then 1400 rpm for 20 sec. The film was precured by heating at 50° C. on a hot plate for 10 min followed by heating at 25 Torr for 8 h at 50° C. The film was corona poled and crosslinked by applying a voltage of 7.5 kV to the wafer while heating at 180° C. for 20 min. The thickness of the layer was 1.2 μm and the refractive index was 1.55.

The first polymer buffer clad was spin deposited on the electro-optic first polymer clad as a liquid at 500 rpm for 5 seconds and 1800 rpm for 40 seconds. The wafer was then exposed to UV radiation until the film was hardened. The thickness of the layer was 3.1 μm and the refractive index was 1.495.

The surface of the first polymer buffer clad was treated with oxygen/neon plasma for 7 min in order to promote adhesion of a gold layer. The gold layer was deposited and the gold electrode was defined over one arm of the Mach-Zehnder modulator by photolithography and wet etching. The wafer was diced into individual Mach-Zehnder electro-optic devices.

Other embodiments are within the following claims.

What is claimed is:

1. An electro-optic waveguide device, comprising (a) an electro-optic polymer core having a thickness of about 2.4 to about 3.8 μm and a refractive index of about 1.54 to about 1.62 and (b) an electro-optic first polymer clad in proximity to the electro-optic polymer core, the electro-optic first polymer clad having a refractive index that is lower than the refractive index of the electro-optic polymer core.

2. The electro-optic waveguide device of claim 1, further comprising (a) a first polymer buffer clad in proximity to the electro-optic first polymer clad, the first polymer buffer clad having a refractive index that is lower than the refractive index of the electro-optic first polymer clad and (b) a second polymer buffer clad in proximity to the electro-optic polymer core, the second polymer buffer clad having a refractive index that is lower than the refractive index of the electro-optic polymer core.

3. The electro-optic waveguide device of claim 2, wherein (a) the electro-optic first polymer clad has a thickness of about 1.0 to about 3.0 μm and a refractive index of about 1.53 to about 1.61; (b) the first polymer buffer clad has a thickness of about 2.2 to about 3.2 μm and a refractive index of about 1.445 to about 1.505; and (c) the second polymer buffer clad has a thickness of about 2.2 to about 3.2 μm and a refractive index of about 1.445 to about 1.505.

4. The electro-optic waveguide device of claim 1 further comprising (a) a second polymer clad in proximity to the electro-optic polymer core, the second polymer clad having a refractive index that is lower than the refractive index of the electro-optic polymer core; (b) a first polymer buffer clad in proximity to the electro-optic first polymer clad, the first polymer buffer clad having a refractive index lower than the refractive index of the electro-optic first polymer clad; and (c) a second polymer buffer clad in proximity to the second polymer clad, the second polymer buffer clad having a refractive index lower than the refractive index of the second polymer clad.

5. The electro-optic waveguide device of claim 4, wherein (a) the electro-optic first polymer clad has a thickness of about 1.0 to about 3.0 μm and a refractive index of about 1.53 to about 1.61; (b) the second polymer clad has a thickness of about 1.0 to about 3 μm and a refractive index of about 1.53 to about 1.61; (c) the first polymer buffer clad has a thickness of about 2.2 to about 3.2 μand a refractive index of about 1.445 to about 1.505; and (d) the second polymer buffer clad has a thickness of about 2.2 to about 3.2 μm and a refractive index of about 1.445 to about 1.505.

6. The electro-optic waveguide device of claim 2, wherein (a) the electro-optic polymer core and electro-optic first polymer clad comprise crosslinked polymers; (b) the first polymer buffer clad comprises a crosslinked acrylate polymer; and (c) the second polymer buffer clad comprises an organically modified sol gel.

7. The electro-optic waveguide device of claim 4, wherein (a) the electro-optic polymer core and electro-optic first polymer clad comprise crosslinked polymers; (b) the second polymer clad comprises an organically modified sol gel; (c) the first polymer buffer clad comprises a crosslinked acrylate polymer; and (d) the second polymer buffer clad comprises an organically modified sol gel.

8. An electro-optic waveguide device of claim 4, wherein the second polymer clad comprises an organically modified titania-siloxane sol gel.

9. An electro-optic waveguide device of claim 4, wherein the second polymer clad comprises an electro-optic polymer.

10. An electro-optic waveguide device of claim 9, wherein the second polymer clad comprises a crosslinked electro-optic polymer.

11. The electro-optic waveguide device of any one of claims 1, 2, or 4, wherein the electro-optic polymer core is in the form of a rib, quasi-rib, or buried trench.

12. An electro-optic waveguide device of claim 1, wherein the electro-optic waveguide device is selected from the group consisting of Mach Zehnder modulators, directional couplers, and micro-ring resonators.

13. A beam steering system comprising the electro-optic waveguide device of claim 1.

14. A phased array radar comprising the electro-optic waveguide device of claim 1.

15. An optical router comprising the electro-optic waveguide device of claim 1.

16. An optical transponder comprising the electro-optic waveguide device of claim 1.

17. An optical satellite comprising the electro-optic waveguide device of claim 1.

18. An electro-optic waveguide device, comprising:
  (a) an electro-optic polymer core comprising a crosslinked polymer and having a refractive index;
  (b) an electro-optic first polymer clad in proximity to the electro-optic polymer core, the electro-optic first polymer clad comprising a crosslinked polymer and having a refractive index that is lower than the refractive index of the electro-optic polymer core;
  (c) a first polymer buffer clad in proximity to the electro-optic first polymer clad, the first polymer buffer clad comprising a crosslinked acrylate polymer and having a refractive index that is lower than the refractive index of the electro-optic first polymer clad; and
  (d) a second polymer buffer clad in proximity to the electro-optic polymer core, the second polymer buffer clad comprising an organically modified sol gel and having a refractive index that is lower than the refractive index of the electro-optic polymer core.

19. The electro-optic waveguide device of claim 18, wherein (a) the electro-optic polymer core has a thickness of about 2.4 to about 3.8 μm and a refractive index of about 1.54 to about 1.62, and (b) wherein the electro-optic first polymer clad has a thickness of about 1.0 to about 3.0 μm and a refractive index of about 1.53 to about 1.61.

* * * * *